Feb. 13, 1962 R. M. BOWLER ET AL 3,020,571

LASTING MACHINES

Filed May 18, 1959 14 Sheets-Sheet 1

Inventors
Raymond M. Bowler
Melvin Clamp
By their Attorney
Everett D. Littlefield Feb. 13, 1962 R. M. BOWLER ET AL 3,020,571

LASTING MACHINES

Filed May 18, 1959 14 Sheets-Sheet 2

Feb. 13, 1962 R. M. BOWLER ETAL 3,020,571

LASTING MACHINES

Filed May 18, 1959 14 Sheets-Sheet 4

Feb. 13, 1962 R. M. BOWLER ET AL 3,020,571

LASTING MACHINES

Filed May 18, 1959 14 Sheets-Sheet 6

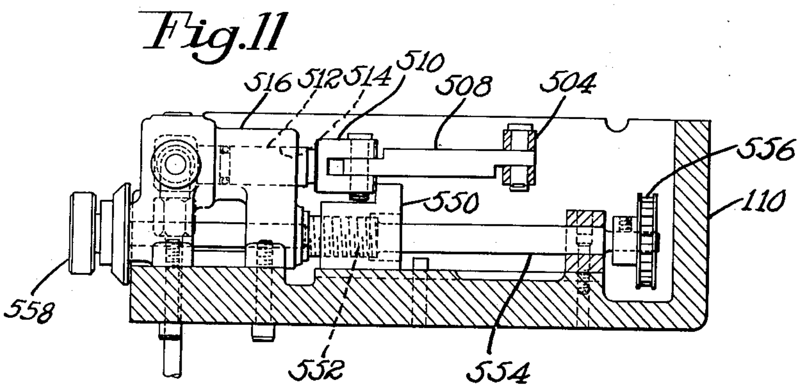
Fig.11
Fig.12
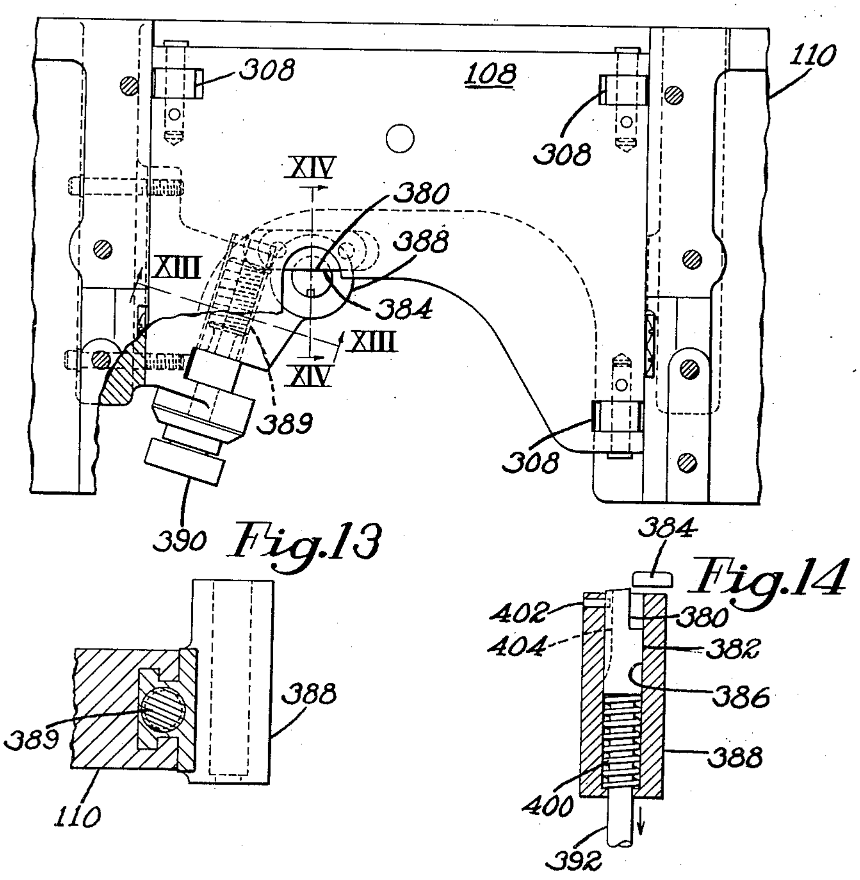
Fig.12, Fig.13, Fig.14

Feb. 13, 1962 R. M. BOWLER ET AL 3,020,571

LASTING MACHINES

Filed May 18, 1959 14 Sheets-Sheet 10

Feb. 13, 1962 R. M. BOWLER ETAL 3,020,571

LASTING MACHINES

Filed May 18, 1959 14 Sheets-Sheet 12

Feb. 13, 1962 R. M. BOWLER ETAL 3,020,571

LASTING MACHINES

Filed May 18, 1959 14 Sheets-Sheet 14

3,020,571

LASTING MACHINES

Raymond M. Bowler, Salem, N.H., and Melvin Clamp, Andover, Mass., assignors to United Shoe Machinery Corporation, Boston, Mass., a corporation of New Jersey Filed May 18, 1959, Ser. No. 814,060
16 Claims. (Cl. 12—8.8)

This invention relates to lasting machines and has for its general object the provision of improvements in machines for lasting the toe ends of shoes of the type disclosed in United States Letters Patent No. 2,804,634, granted September 3, 1957, on an application filed in the names of the present inventors, which machine is a further development of an earlier machine disclosed in United States Letters Patent No. 2,324,509, granted July 20, 1943, in the name of Bernhardt Jorgensen and modified in some respects as taught in United States Letters Patent No. 2,663,036, granted December 22, 1953, also in the name of Bernhardt Jorgensen. It is to be understood, however, that various features of the present invention, as hereinbefore described, are not limited to use in toe lasting machines of this particular type or to the exact mechanical construction illustrated.

As is taught in Patent No. 2,804,634, referred to above, the upper materials may be shaped to the toe end of the last by toe embracing wipers which are moved heightwise of the shoe being lasted and which, thereafter, are advanced and closed to wipe the lasting margin of the upper materials inwardly over the bottom of the toe end of the shoe. During such upwiping movement it is desirable for various reasons and as will be readily understood, that the wipers each be free to yield outwardly away from the side of the toe end of the shoe and for this purpose spring means have hitherto been provided in the wiper closing mechanism to permit such yielding action. However, when the wipers are subsequently advanced and closed, such yielding action may be quite disadvantageous inasmuch as it can result in a partial closing of one or both of the wipers and an incompleted overwiping action.

An object of this invention is therefore to provide a novel and improved wiper operating mechanism for overcoming the above-mentioned disadvantage. With this particular object in view, and in accordance with a feature of the invention, in the herein illustrated machine the wiper closing mechanism includes fluid pressure operated means for exerting a variably predetermined force on the wipers for yieldingly urging the wipers toward closing position during the relative heightwise movement of the wipers and the shoe and for thereafter positively closing the wipers during their advancing movement. More particularly, the wiper closing mechanism includes a wiper carrier movable to advance the wipers and having wiper holders mounted thereon, together with operating levers associated with these holders and connected to pistons operating in cylinders to which fluid under a variably predetermined pressure is supplied to cause the wipers to be yieldingly urged toward closed position during relative heightwise movement between the wipers and the shoe and in which the operating fluid is trapped to cause the wipers to be positively closed during movement of the carrier to advance the wipers.

In machines of the type here under consideration the wipers and the wiper operating mechanism are mounted on a wiper support which is movable relatively to the shoe support in a direction extending heightwise of a shoe thereon and thereafter a wiper carrier is moved on the support to advance and close the wipers. During such advancing and closing of the wipers, it is desirable that the wipers exert a downward pressure on the upper materials which is of an intensity appropriate for the particular character of the upper materials being lasted. Inasmuch as this downward pressure is usually of a value considerably less than that which would be produced by the weight of the wiper support and other parts carried thereby, it has hitherto been proposed to provide means for counterbalancing at least a substantial portion of the weight of these parts, together with separately adjustable means for exerting a force on the wiper support in a direction to cause the wipers to exert a predetermined pressure on the upper materials, and it is still another object of this invention to provied a novel and improved arrangement for accomplishing this purpose.

With this object in view, and in accordance with another feature of the invention, in the herein illustrated machine means operating in time relation to the wiper advancing and closing means are provided for counterbalancing the weight of the wiper support and parts carried thereby during the advancing and closing movements of the wipers, together with means for exerting a predetermined force on the wiper support for causing the wipers to press the upper materials yieldingly against the bottom of the shoe as they are advanced and closed. More particularly, the means for moving the wiper support in a direction extending heightwise of the shoe being lasted, comprises a hollow piston having a second piston slidable therein which is connected to the wiper support. Fluid pressure operated means are provided for elevating the hollow piston to effect heightwise movement of the wiper support, together with means for introducing fluid under a variably predetermined pressure beneath the second piston for counterbalancing the weight of the wiper support and parts carried thereby during the advancing and closing movements of the wipers, and means for introducing fluid under a variably predetermined pressure above the second piston to cause the wipers to press the upper materials yieldingly against the bottom of the shoe as they are advanced and closed.

The above and other objects and features of the invention will appear in the following detailed description of the preferred embodiment thereof which is illustrated in the accompanying drawings and will be pointed out in the claims.

In the drawings,

FIG. 1 is a view in side elevation of a toe lasting machine embodying the features of this invention;

FIGfl 2 is a view in front elevation of the machine shown in FIG. 1;

FIG. 11 is a view in vertical section substantially on line XI—XI of FIG. 8 and looking in the direction of the arrows;

FIG. 12 is a plan view of certain parts associated with the wiper operating mechanism;

FIG. 13 is a view in section substantially on line XIII—

Figure 15:
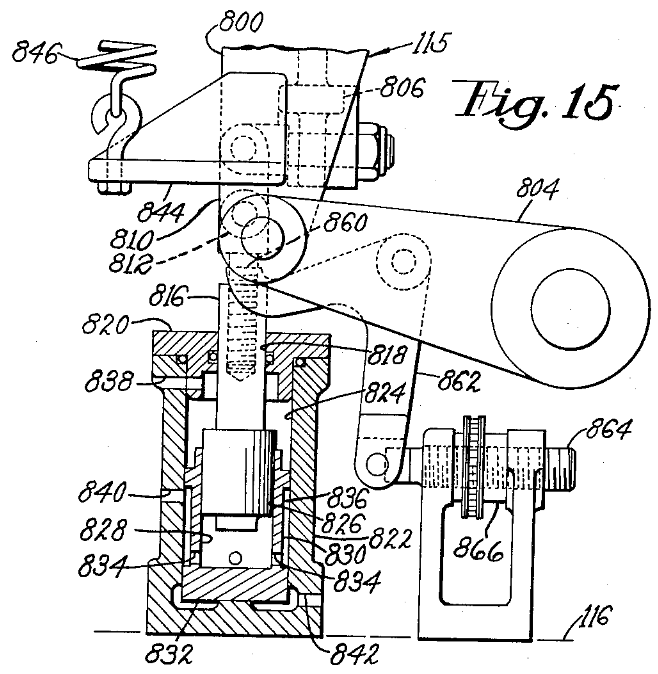
Figure 16:
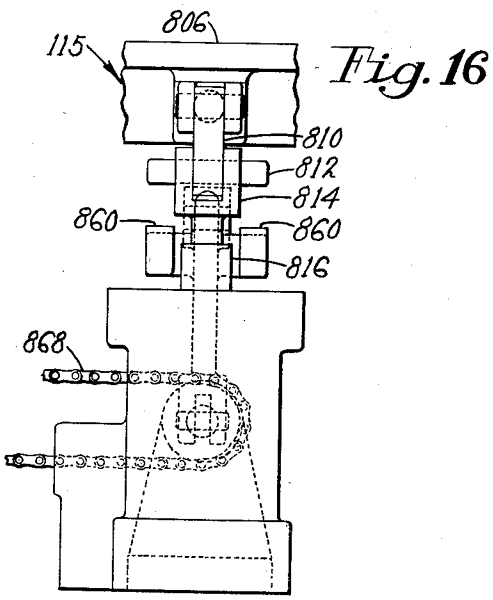
Figure 17:
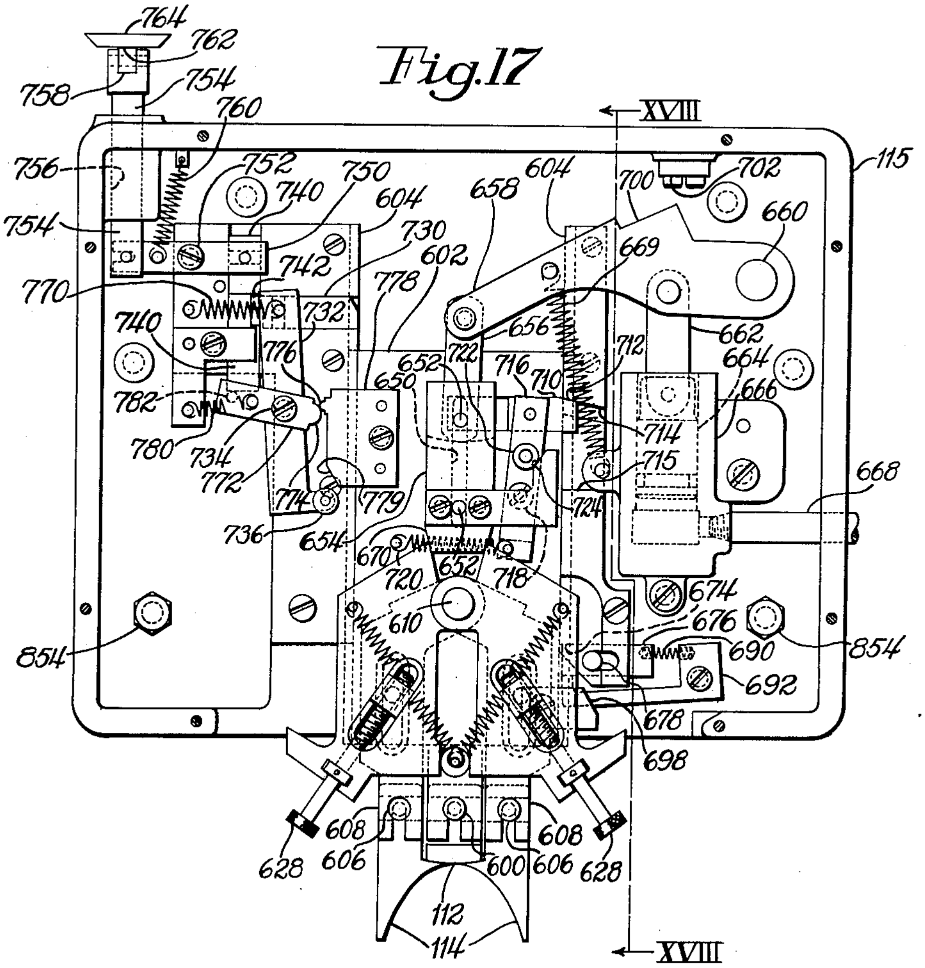
Figure 18:
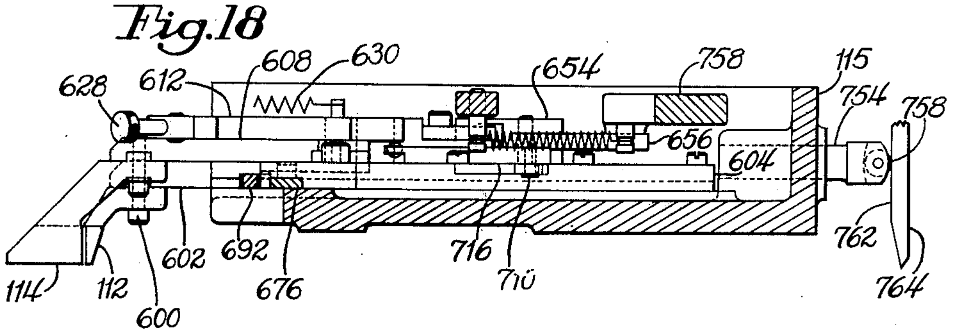
Figures 19, 20, 21:
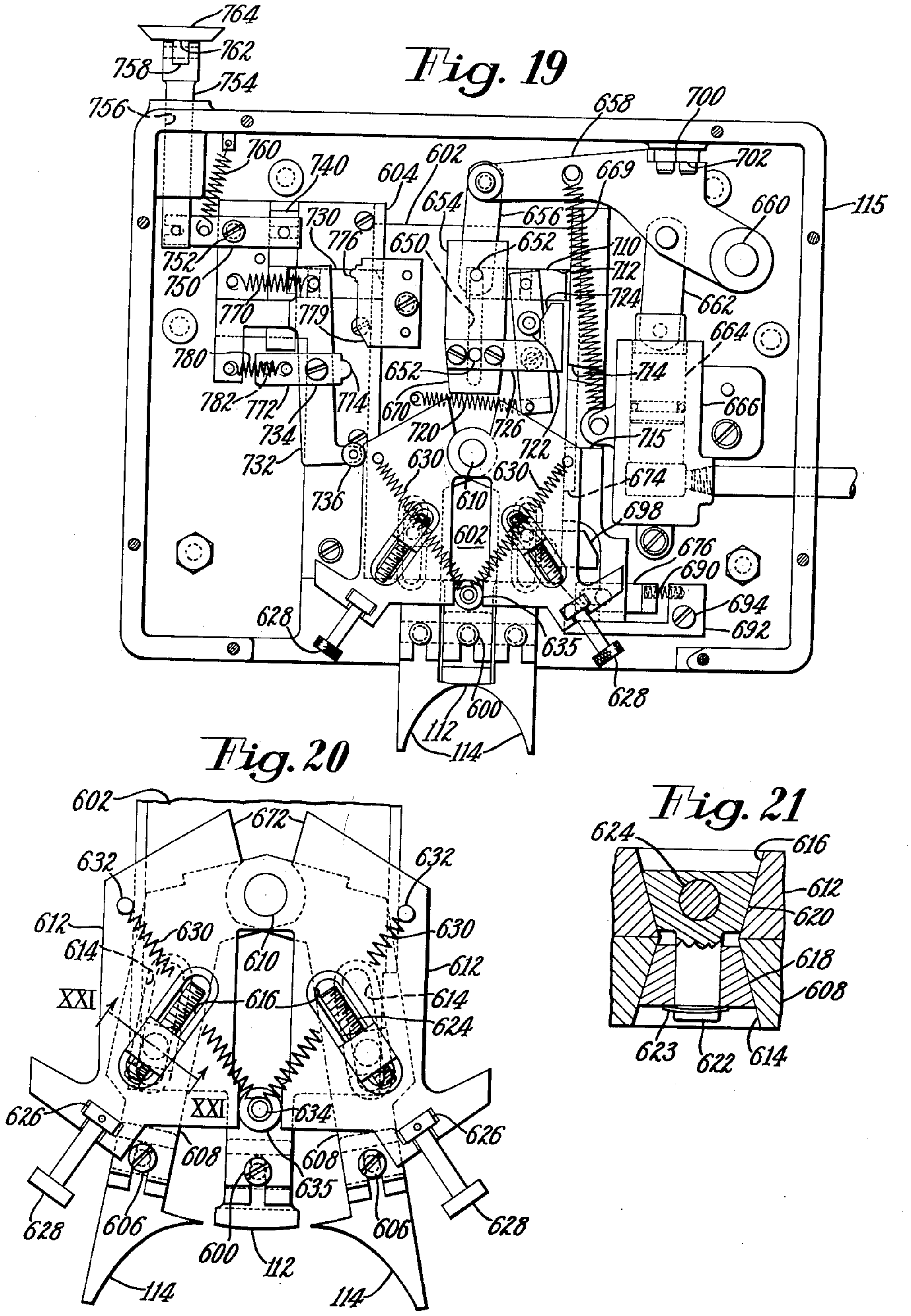
Figure 22:
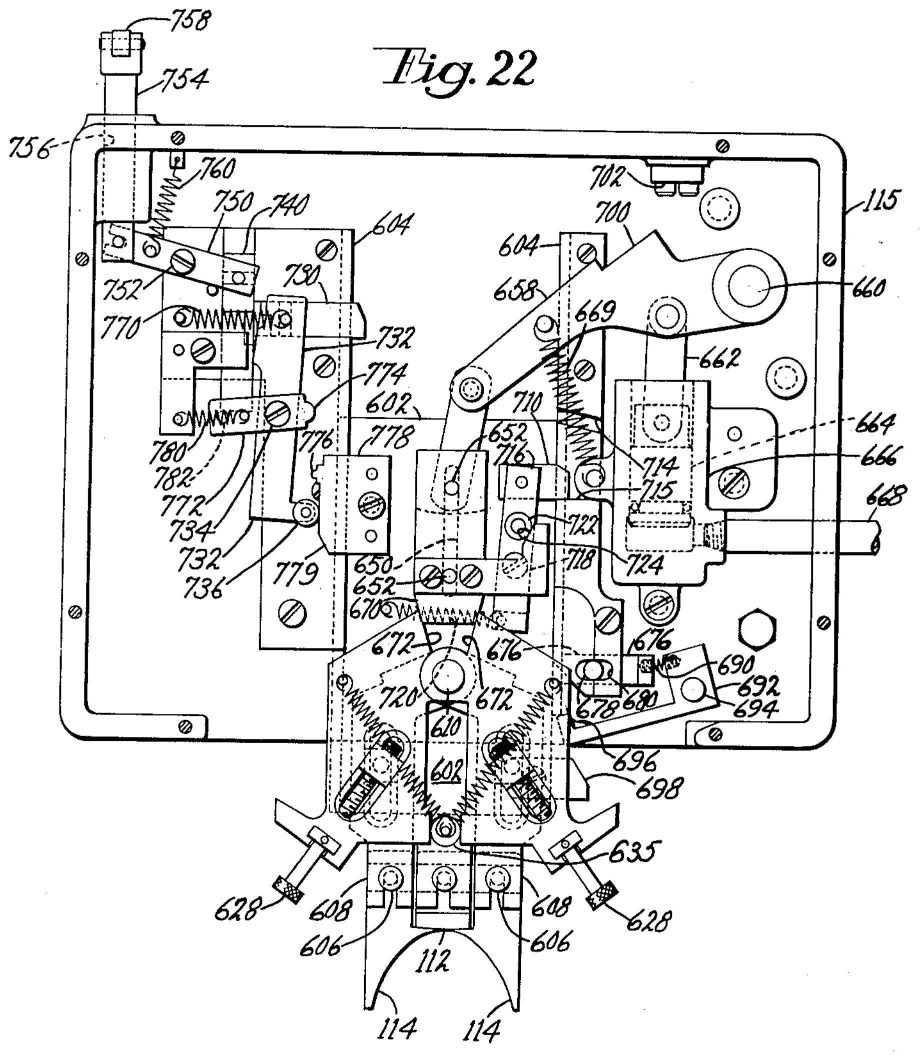
Figure 23:
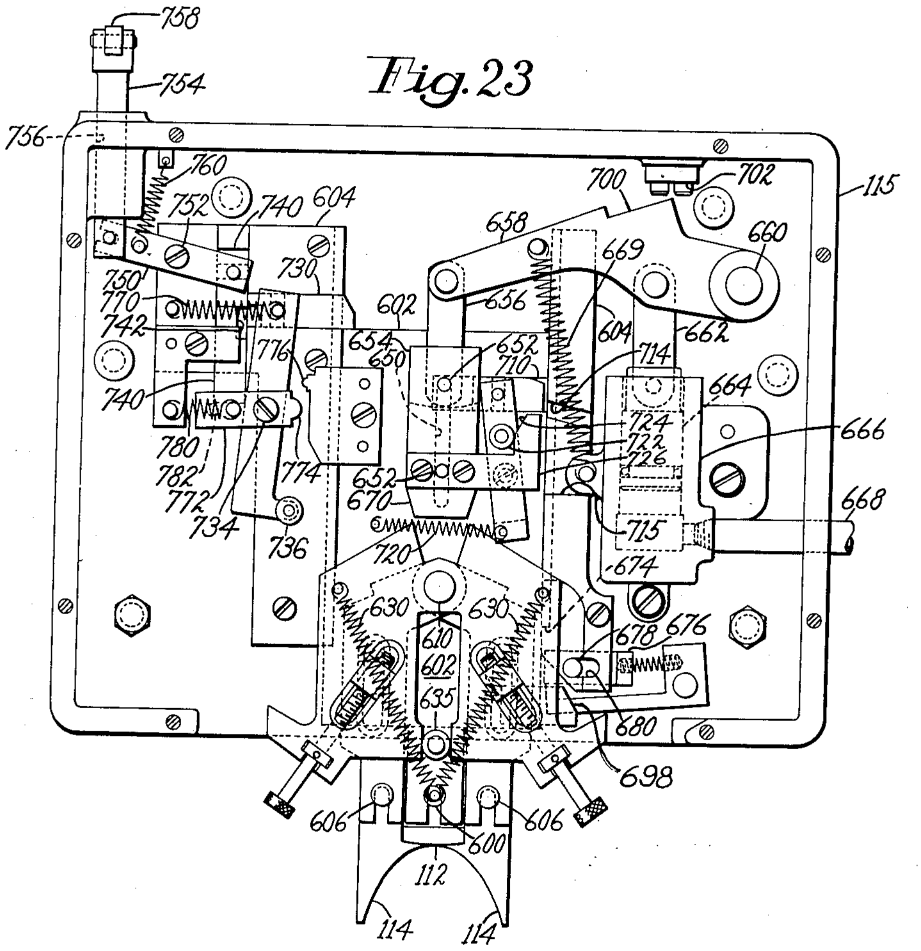
Figure 29:
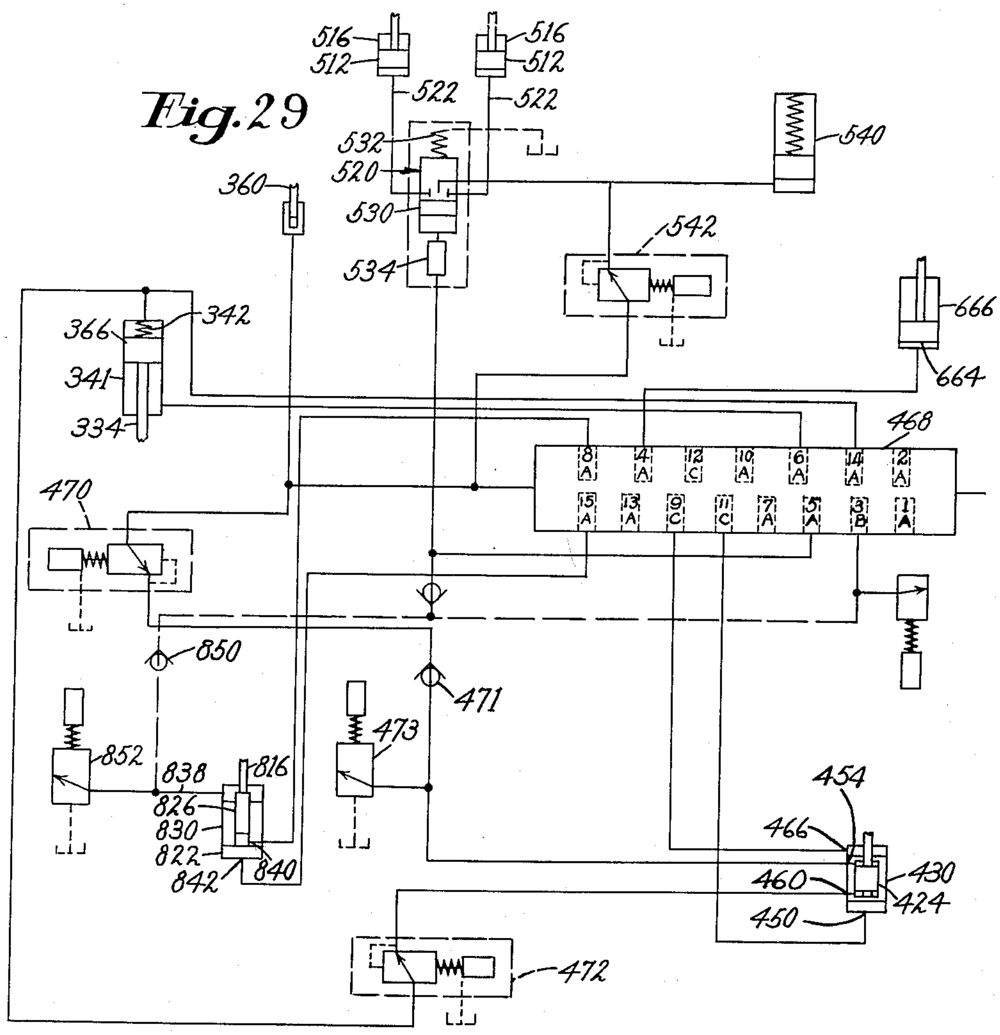

XIII of FIG. 12 and looking in the direction of the arrows;

FIG. 14 is a view in section substantially on line XIV—XIV of FIG. 12 and looking in the direction of the arrows;

FIG. 15 is a view in side elevation and at an enlarged scale of the lower portion of a distributor mechanism forming part of the machine;

FIG. 16 is a view in front elevation of that portion of the distributor mechanism which appears in FIG. 15;

FIG. 17 is a plan view of the distributor mechanism;

FIG. 18 is a view in vertical section substantially on line XVIII—XVIII of FIG. 17 and looking in the direction of the arrows;

FIG. 19 is a plan view of the distributor mechanism with the distributor fingers in different positions assumed during the operation of the machine;

FIG. 20 is a plan view of the distributor fingers shown at an enlarged scale;

FIG. 21 is a view in section substantially on line XXI—XXI of FIG. 20 and looking in the direction of the arrows;

FIGS. 22 and 23 are plan views of the distributor mechanism with the distributor fingers in other operating positions assumed during the operation of the machine;

FIGS. 24–28 are a series of views in side elevation of the operating elements of the machine and the toe end of a shoe being lasted with certain of these elements and the shoe shown in vertical section and with the operating elements in various different positions assumed during the operation of the machine; and FIG. 29 is a schematic drawing showing the fluid pressure system associated with the machine.

Referring to these drawings, the machine therein illustrated is, with the exception of the improvements of the present invention, similar to hte machine disclosed in United States Letters Patent No. 2,804,634, referred to above. Thus, the herein illustrated machine has a shoe rest 100, a toe rest 102 which is moved upwardly to clamp the toe end of a shoe against the shoe rest by fluid pressure operated mechanism, not shown herein or in the mentioned patent, but which is similar to that provided in the lasting machine disclosed in United States Letters Patent No. 2,324,509, as modified in some respects as taught in United States Letters Patent No. 2,663,036, referred to above, and a heel rest, not shown, likewise actuated by fluid pressure operated mechanism similar to that provided in the Jorgensen machines. For wiping the upper materials of a shoe upwardly around the toe end of a last and for thereafter wiping the lasting margin of the upper materials inwardly over the bottom face of an insole on the last, the machine has a pair of wipers 106, 106 associated with a wiper carrier 108 which is slidably supported by and operated by mechanism mounted on a wiper support 110, FIGS. 8 and 9. As in the machine of our prior patent, the tensioning of the upper materials around the toe end of the last is effected by three distributor fingers 112, 114, 114, FIG. 17, which are associated with a support 115 and correspond to the retarders or distributor fingers 60, 62, 62 of the machine of our prior patent, for clamping the lasting margin of the upper materials yieldingly against the upper surface of the wipers during the heightwise movements of these wipers to wipe the upper materials around the toe end of the last. These operating elements, as well as others to be mentioned below, are associated with a frame construction indicated generally by the reference character 116.

Figure 1:
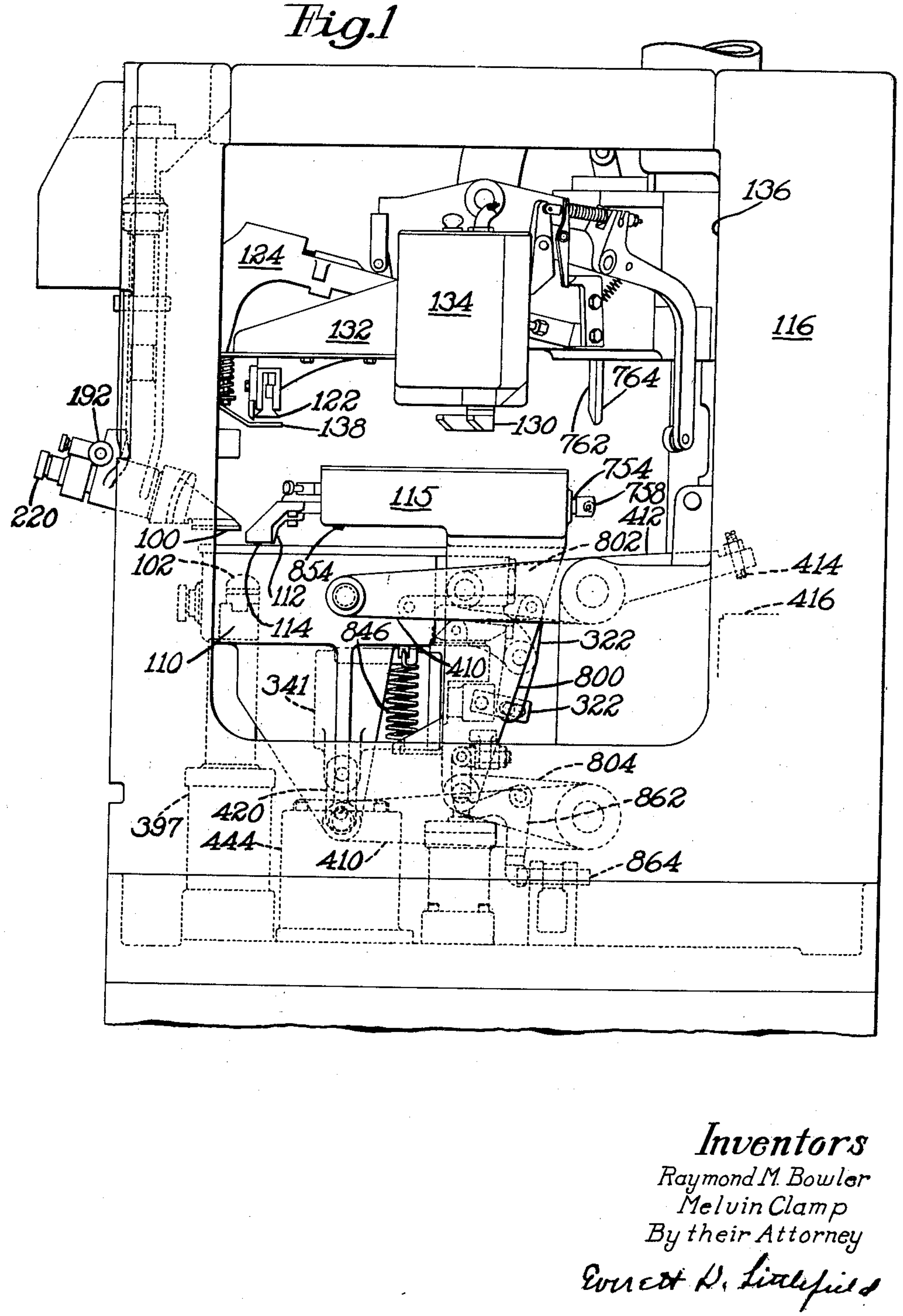
Figures 24, 25, 26, 27, 28:
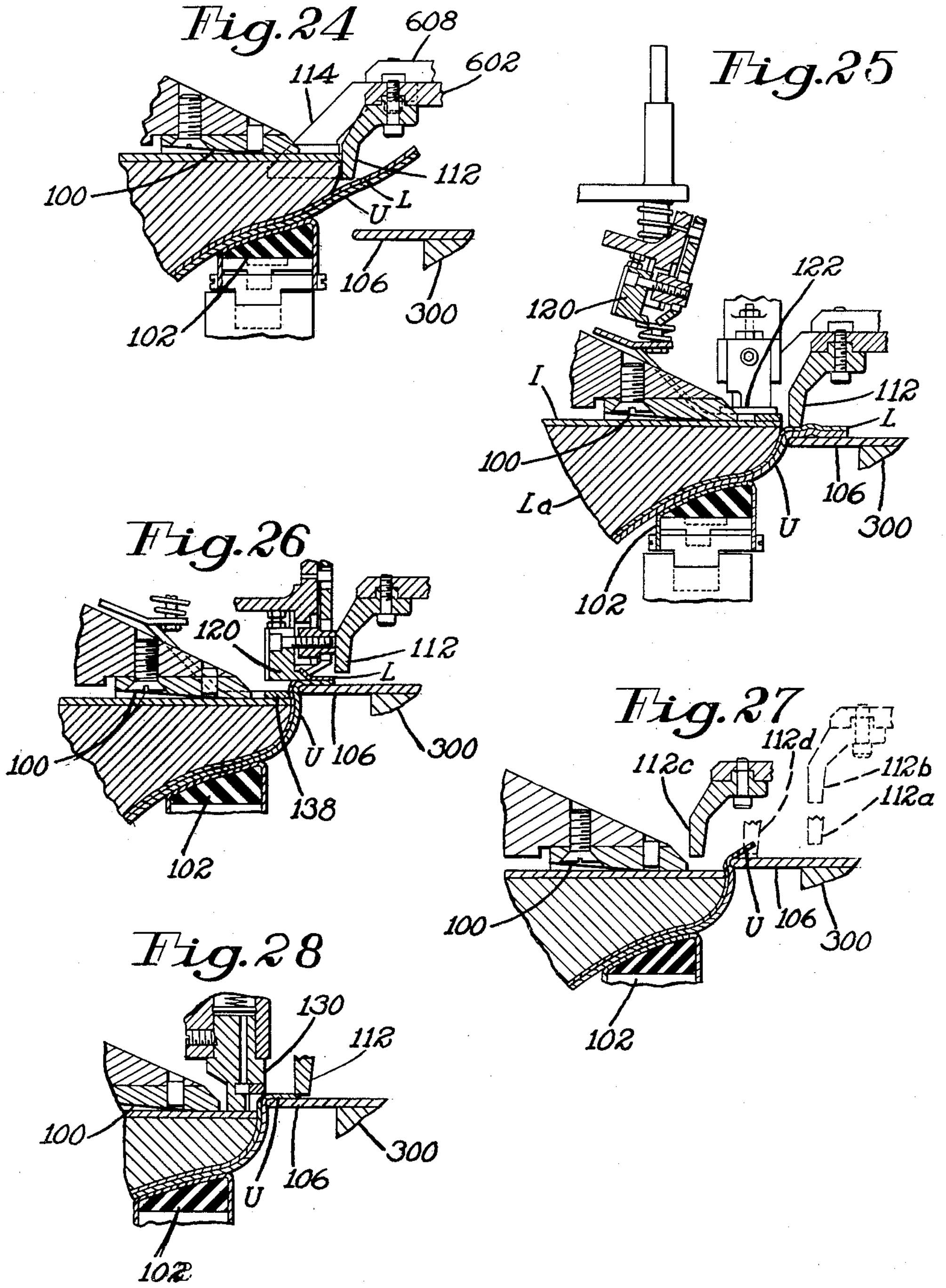

In common with our prior machine and also the machine of the Jorgensen Patent No. 2,324,509, the herein illustrated machine is provided with upper trimming means including a knife 120 movable lengthwise of the shoe being lasted, FIGS. 25 and 26, and a pair of knives 122, 122 movable widthwise of the shoe, FIG. 1, together with a cement nozzle 130, FIGS. 1 and 28. The knife 120 is mounted on an operating member 124 which, together with the knives 122, 122, is carried on an arm 132, and all of these knives are arranged to be operated by means of mechanism, not shown herein or in our prior patent, which is similar to that disclosed in the last-mentioned Jorgensen patent. Similarly, the cement nozzle 130 is associated with a heated cement pot 134, mounted on the mentioned arm 132 and mechanism, not shown, but similar to that disclosed in the last-mentioned Jorgensen patent, is provided for delivering heated molten cement to the nozzle at an appropriate time in the operating cycle of the machine. The arm 132 is secured to a post 136 which is arranged to be rotated and moved axially by mechanism, not shown, but similar to that disclosed in the last-mentioned Jorgensen patent, for the purpose of presenting the upper trimming knives and the cement nozzle to operative positions at predetermined times in the operating cycle of the machine. Also associated with the arm 132 is an insole holddown 138, corresponding to the insole holddown 420 of the machine of our prior patent.

Figure 6:
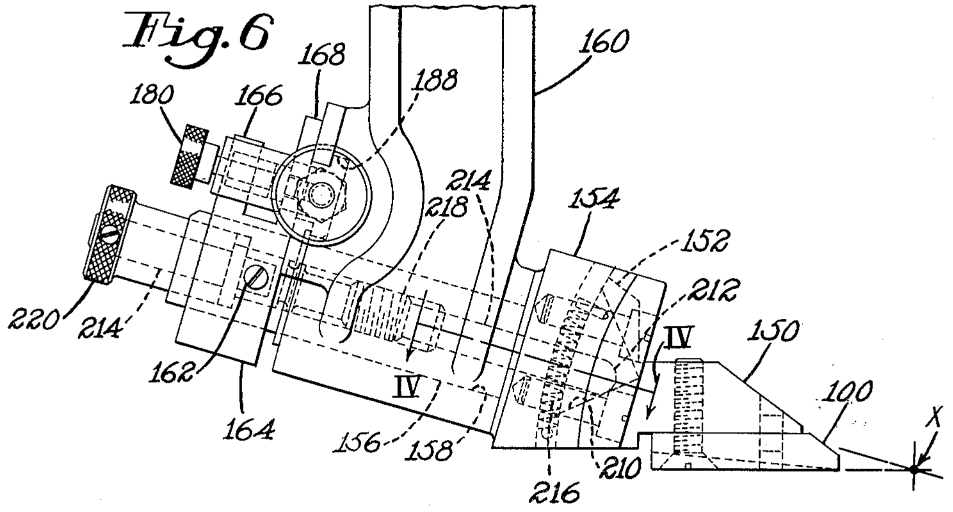
FIG. 6 is a view in side elevation of the shoe rest shown in FIG. 3.

The shoe rest 100 is secured to a forwardly projecting portion 150 of a block 152 which is guided for arcuate tipping movement about a vertical axis passing through a point "*x*," FIG. 6, in a head member 154. This head member is formed on one end of a hollow shaft 156 which is rotatably mounted in a bore 158 in a supporting yoke piece 160, FIG. 4, associated with the frame 116, FIG. 2. The axis of the bore 158 is inclined to the lower surface of the shoe rest and, as indicated in FIG. 6 passes through the point "*x*." Secured to the other end of the shaft 156 which extends beyond the yoke piece 160 by means of a setscrew 162 is a member 164 provided with two axially spaced upwardly extending arms 166, 168, FIG. 5. Connected to these two arms, by means of a pin 170, are two links 172, 174 which, in turn, are connected, respectively, to two blocks 176, 178 by means of spring-pressed plungers 180, 182 which extend into bores 184, 186 in these blocks, FIG. 5. The blocks 176, 178 are slidably mounted in a guideway 188, formed in the yoke piece 160, and are adapted to be moved toward or away from each other by means of a right and left hand screw 190 having an operating knob 192 which is held against axial movement by engagement within a slot 194 in a plate 196 which is secured to the yoke piece, FIG. 3.

Figure 2:
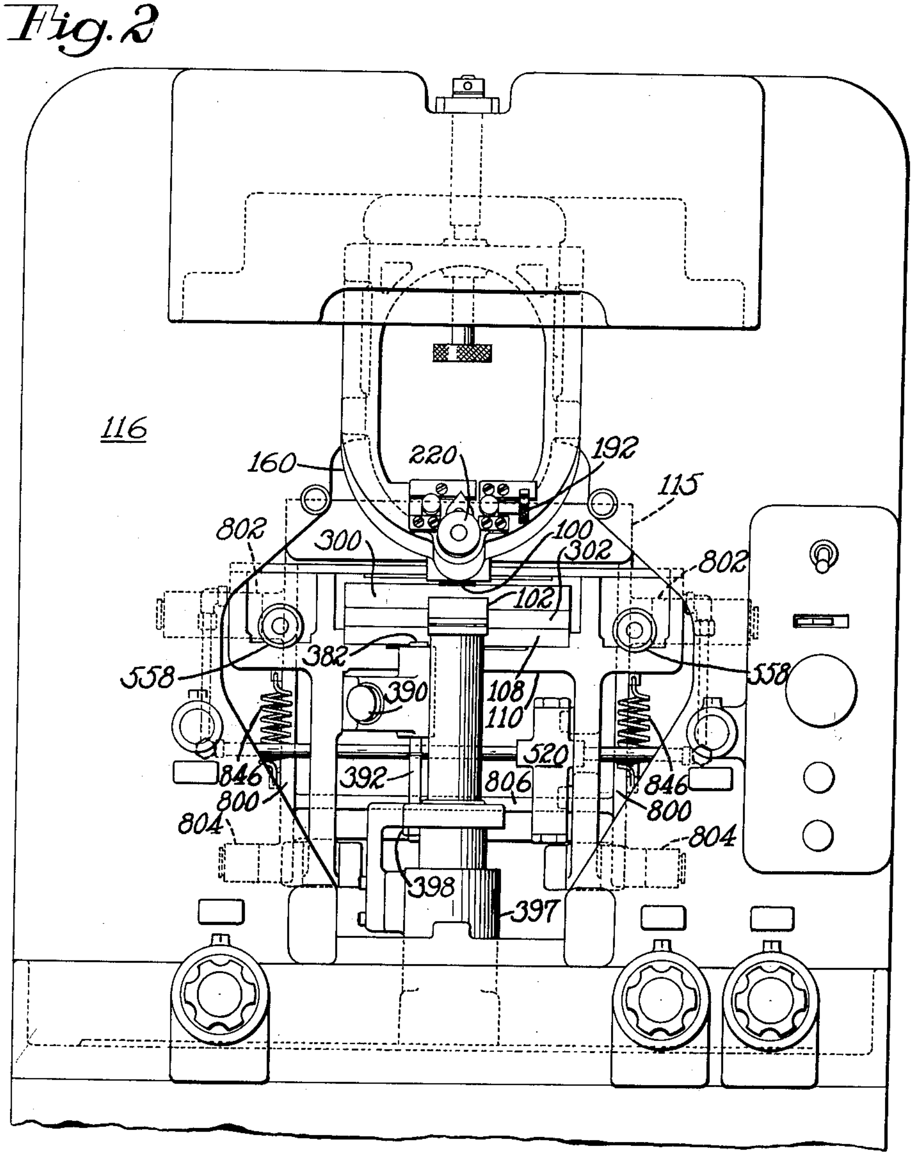
Figures 3, 4, 5:
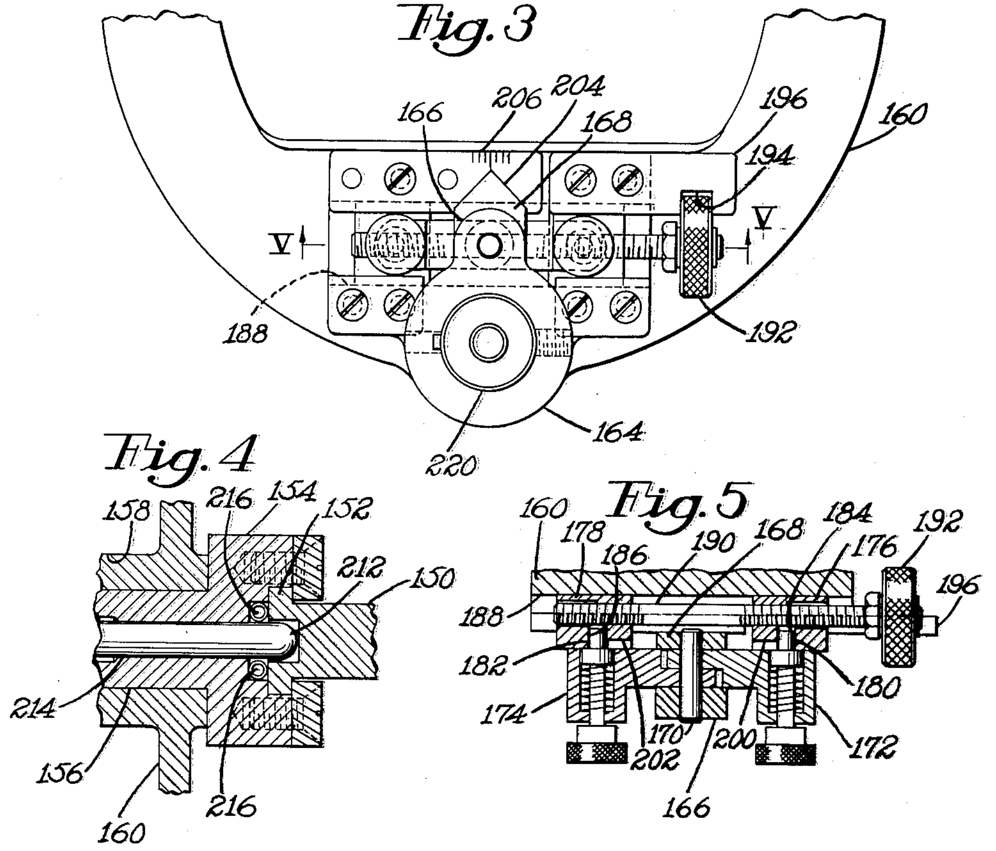
FIG. 3 is a view in front elevation of a shoe rest construction forming a part of the machine.
FIG. 4 is a view in section substantially on line IV—IV of FIG. 6 and looking in the direction of the arrows.
FIG. 5 is a view in section substantially on line V—V of FIG. 3 and looking in the direction of the arrows.

When the parts just described are in the positions in which they are shown in FIGS. 3 and 5, movement of the blocks 176, 178 is prevented by the straight-line relation of links 172, 174 and the engagement of the plungers 180, 182 in the bores 184, 186, and the shaft 156 is held in its mid position so that a line extending transversely of the lower surface of the shoe rest 100 lies in a horizontal plane, see FIG. 2. Leading inwardly from the bores 184, 186, respectively, are grooves 200, 202. When the plunger 180 is withdrawn partially from the bore 186 and into alinement with the groove 200, the block 176 will be released from the link 172 for movement to the right relatively thereto. Now, by rotating the right and left-hand screw 190 this block may be moved to the right, while the block 178 is moved an equal distance to the left, thereby rotating the shaft 156 through a small angle in a counterclockwise direction, as viewed in FIG. 3, the extent of such angular movement being determined by the extent of movement of the blocks 176, 178. As will be apparent, if the plunger 182 is now withdrawn partially from its bore 186 and into alinement with the groove 202, the links 172, 174 can be moved to the right, until the plunger 180 is in register with the bore 184 and such bodily movement of these links will effect angular displacement of the shaft 156 from its mid position in a clockwise direction, which displacement will be exactly equal to its first angular displacement in a counterclockwise direction. Thus, the shoe rest 100 may be rocked in either direction about an axis extending generally lengthwise thereof and passing through the point "x," and to a variable extent as determined by the adjusting screw 190. Accordingly, the shoe rest 100 may be set so as to position right and left shoes of lasts having bottoms which curve transversely and by different amounts on the opposite sides of the center line of the last in such a way that the marginal portions of the bottom of a shoe on the last at the opposite sides thereof may be brought into parallelism with the lateral plane of the wipers 106, 106. Conveniently, the arm 168 may be formed with an end 204 adapted to serve as a pointer for reference to a scale 206, FIG. 3.

In a like manner, the shoe rest 100 may be tipped about a transverse axis extending through the point "x" in order to bring the marginal portion of the bottom of lasts of different longitudinal curvature into parallelism with the lengthwise plane of the wipers 106, 106. For thus tipping the shoe rest, the block 152 is provided with an inclined camming or wedging surface 210 which is held yieldingly against the rounded end 212 of an operating rod 214, by means of coil springs 216, 216, FIGS. 4 and 6. This rod is threaded into the shaft 156, as indicated in FIG. 6 by the reference character 218 and extends outwardly through this shaft and beyond the member 164 where it is provided with a hand knob 220. As will be apparent by turning this knob the block 152, together with the shoe rest 100, may be swung in either direction about a transverse axis extending through the point "x." The axis of the shaft 156 is so disposed and the curvature of the guiding surfaces on the head 154 is such that the point "x" coincides, at least substantially, with the extreme toe end of a shoe placed in the machine in proper lengthwise position. Accordingly, as the aforementioned adjusting movements of the shoe rest are effected, this point on the shoe will remain stationary, thereby avoiding undesired displacement of the toe end of the shoe with respect to the wipers.

Figures 7, 8:
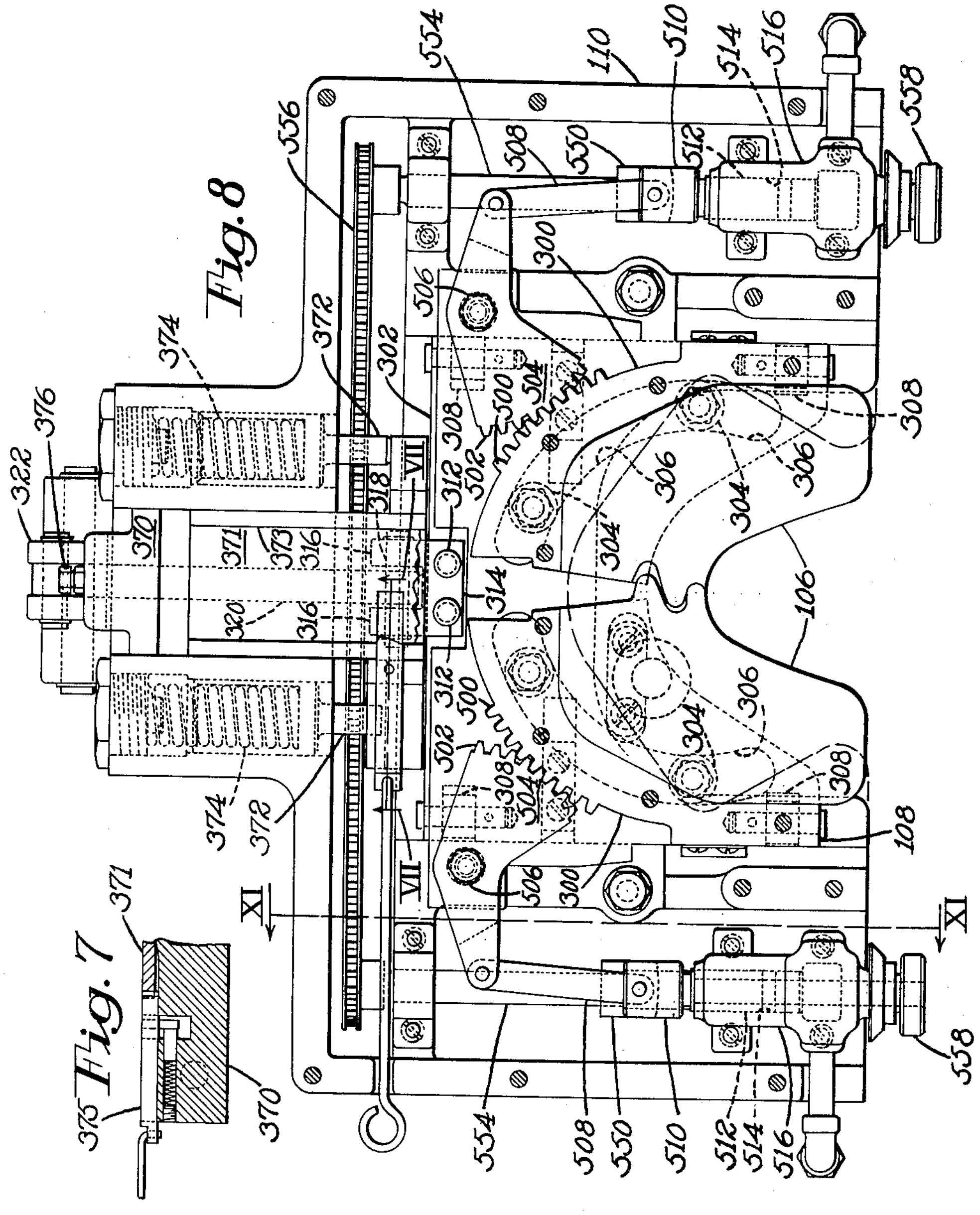
FIG. 7 is a view in section substantially on line VII—VII of FIG. 8 looking in the direction of the arrows.
FIG. 8 is a plan view of wiper operating mechanism forming part of the machine.
Figure 9:
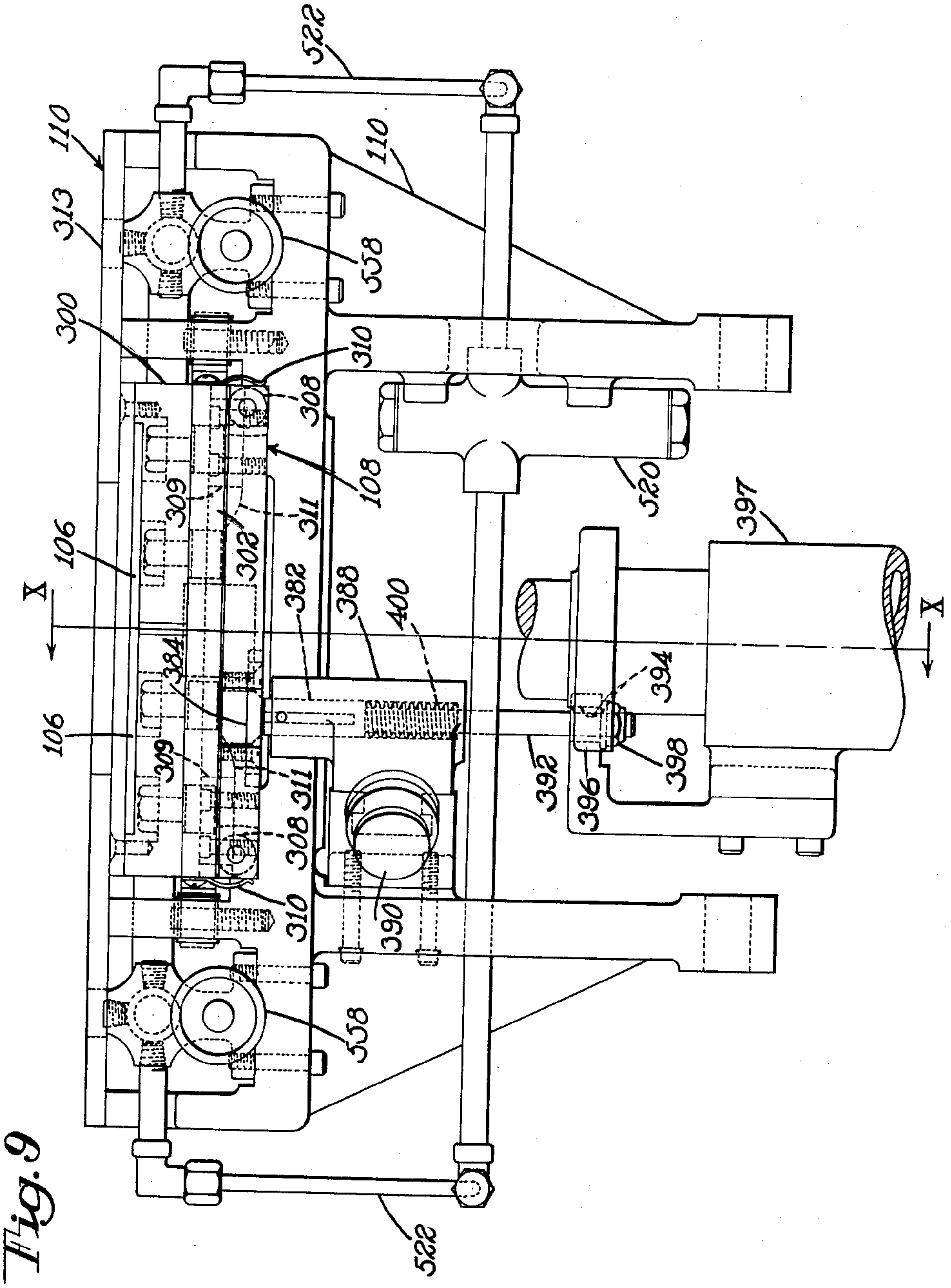
FIG. 9 is a view in front elevation of the wiper operating mechanism with some parts broken away.

Referring to FIGS. 8 and 9, each of the wipers 106 is fitted into a wiper holder 300 and these holders are mounted for arcuate movement on an intermediate member 302, by means of cooperating rolls and grooves 304, 306. This intermediate member rests on anti-friction rolls 308, 308 which are associated with the wiper carrier 108, see FIG. 12, and is normally held in centered relation thereto by means of leaf springs 310, 310, FIG. 9. Key blocks 309, 309, secured to the carrier 108, fit into grooves 311, 311, formed in the intermediate member 302, thus connecting the intermediate member to the carrier with freedom of lateral movement thereon. A cover 313 secured to the upper side of the wiper support 110 extends over portions of the wiper holders and thus holds the parts 300, 302 and 108 together. Connected to the wiper carrier by means of pins 312, 312 is a yoke member 314 having two downwardly extending and spaced-apart ears 316, 316. A pin 318 passes through these ears and also through one end of a link 320 which is of considerably less width than the space between these ears. At its other end the link 320 is connected to one arm of a lever 322 which is pivotally mounted on a portion of the wiper support 110 by means of a pin 324, FIG. 10. The other end of this lever is bifurcated to straddle a link 326 and carries a pin 328 which passes through a slot 330 in this link. The link 326 is connected by means of a pin 332 to the rod 334 of a piston 336. This piston is slidable within a cylinder bore 340 in a cylinder 341 forming a part of the wiper support 110 and is provided with two spring-pressed pins 342, 342 which engage one end of the cylinder and thus tend to urge the piston yieldingly to the right. Leading into the cylinder bore 340 on the opposite sides of the piston 336 are two ports 344 and 346.

Pivotally mounted on the wiper carrier by means of a pin 350 is a safety latch lever 352 having an operating end 354 which is adapted at times to engage the front (left-hand side as viewed in FIG. 10) of a latch plate 356 on the lever 322. A small piston 360, slidable within a bore 362, has a rounded end for engaging the lever 352 on the right-hand side of the pivot pin 350, and when fluid under pressure is admitted to the cylinder bore 362, through a port 364, the lever 352 is swung in a counterclockwise direction to the position shown against the resistance of a spring-pressed plunger 366. Slidably mounted on a rearwardly extending portion of the wiper support 110 is a T-shaped pressure member 370 which bears against the yoke member 314 and is urged yieldingly to the left, FIG. 10, by means of plungers 372, 372 and compression springs 374, 374, FIG. 8, movement of the member 370 in this direction being limited by the engagement of an adjustable stop screw 376 with a portion of the wiper support 110. When used for certain types of work a so-called trim plate 371 may be placed in a wide groove 373 on top of the member 370, FIG. 8, and held in position by a latch member 375, FIGS. 7 and 8.

Figure 10:
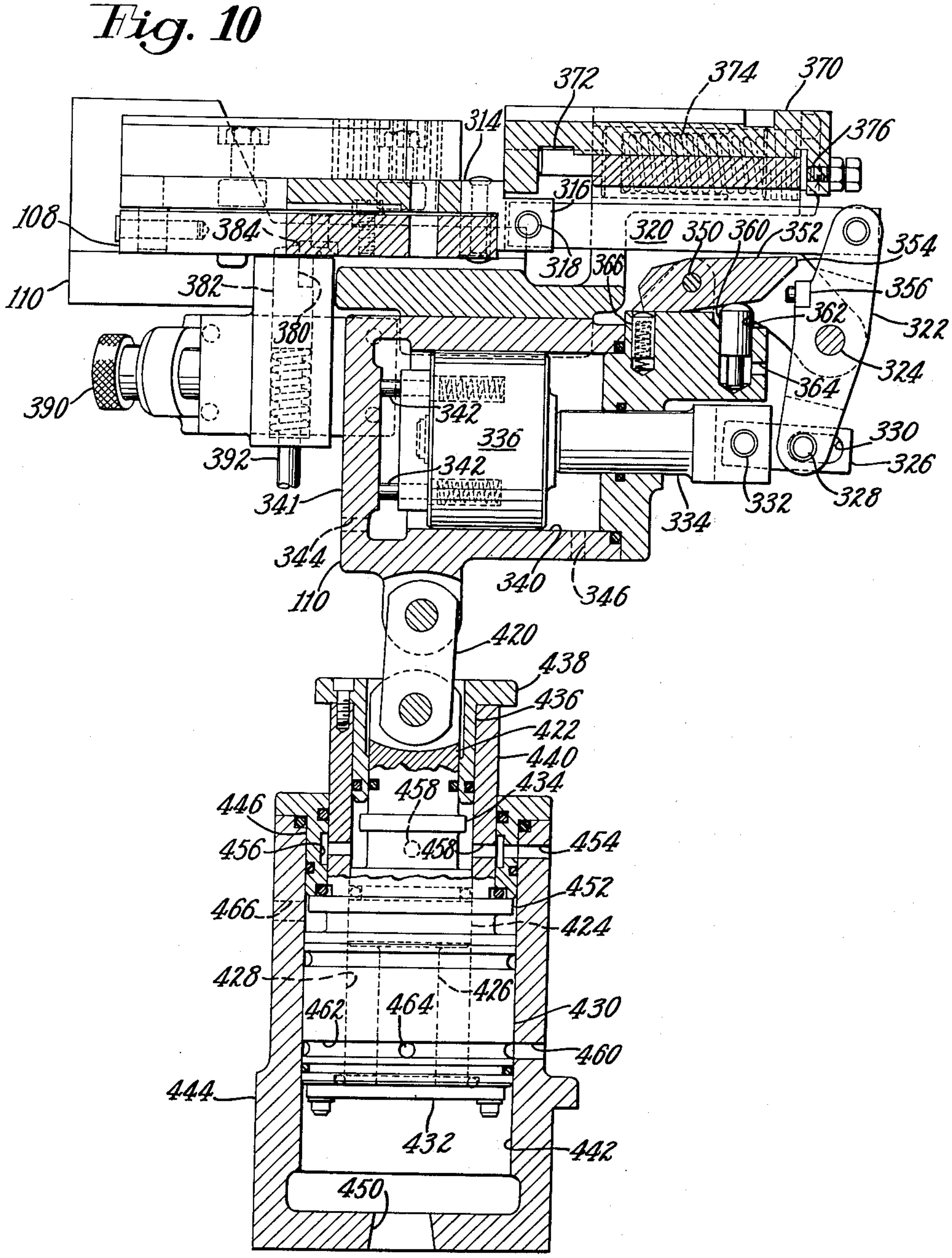
FIG. 10 is a view in vertical section substantially on line X—X of FIG. 9 and looking in the direction of the arrows.

When the various parts are in the positions in which they are shown in FIG. 10, movement of the member 370 and of the wiper carrier 108, together with parts carried thereby, is prevented by the engagement of the operating face 380 of a locking pin 382 with an abutment plate 384 which is secured to the lower side of the wiper carrier. This pin is slidable within a bore 386 formed in a block 388 which is slidably mounted on a portion of the wiper support, FIG. 14. Threaded into the block 388 is an adjusting screw 389 which is provided with a hand knob 390, FIG. 12. The plunger 382 has a stem portion 392 of reduced diameter which extends downwardly through the block 388 and also through a clearance hole 394 formed in an abutment member 396 which is secured to a fixed part 397 of the machine frame, FIG. 9, and has threaded on its lower end a nut 398. A coil spring 400 normally supports the plunger 382 in the elevated position in which it is shown in FIG. 10 of the drawings, while a pin 402 engages a groove 404 in the plunger to prevent it from rotating, FIG. 14.

The wiper support 110 is mounted on the machine frame for vertical movement by means of four pivotally mounted arms 410, 410, two of which appear in FIG. 1 of the drawings, the other two of which are on the opposite side of the support. One of these arms has a rearwardly extending portion 412 which carries an adjustable abutment screw 414 adapted to engage a fixed surface 416 thereby to limit upward movement of the wiper support. Extending downwardly from the cylinder portion 341 of the wiper support 110 is a link 420 which is connected to the upper stem 422 of a piston 424 which has a lower stem 426, FIG. 10. This piston is slidable within a cylinder bore 428 formed in a second piston 430, and movement of the piston 424 in this bore is limited, in one direction, by the engagement of the lower stem 426 with a closure plate 432, secured to the lower end of the piston 430, and in the opposite direction by the engagement of an annular shoulder 434 on the upper stem 422 with a sleeve 436 having a flange 438 secured to the upper portion 440 of the piston 430. The piston 430 is slidable within the bore 442 of a cylinder 444, while its upper portion 440, which is of reduced diameter, extends through a sleeve 446 secured to the upper portion of the cylinder 444. Leading into the bottom of this cylinder is a port 450, and when fluid under pressure is admitted through this port, the piston 430 will be elevated to the position in which it is shown and as determined by the engagement of an annular flange 452 with the lower end of the sleeve 446. With the piston 430 in this position, a port 454 is placed in communication with the bore 428 of the piston 430 above the piston 424 through an annular groove 456 in the sleeve 446 and openings 458, 458 in the upper portion 440 of the piston 424, while a port 460 is placed in communication with the bore 428 below the piston 424 through an annular groove 462 and openings 464. The cylinder 444 is provided with still another port 466 which leads to the space in the bore 442 above the piston 430.

As in the machine of Patent No. 2,804,634, referred to above, movements of the wiper support 110 in directions extending heightwise of the shoe being lasted and also of the wiper carrier 108 in directions extending lengthwise of the shoe are effected by means of fluid under pressure which is admitted to and exhausted from the several ports mentioned above in predetermined time relation under the control of a plurality of cam-operated control valves associated with a pressure manifold 468, generally in the same manner as taught in Patent No. 2,324,509, also mentioned above, and as diagrammatically illustrated in FIG. 29. Thus, at an appropriate point in the operating cycle, fluid under pressure is admitted through the port 450 from a control valve C–11 and at the same time exhausted through port 466 and control valve C–9 as a result of which the wiper support is moved upwardly to cause the wipers 106, 106 to wipe the upper materials around the toe end of the last. Also, in a manner similar to that of the prior machine, just before the wiper support completes its upward movement, the pin 382, FIGS. 9, 10 and 12, is withdrawn from engagement with the plate 384 as the result of the engagement of the nut 398 with the frame member 396, thereby permitting the wiper carrier 108, intermediate member 302, wiper holder 300, and wipers 106, 106 to be moved to the left, FIG. 10, by the spring-pressed plungers 372, 372 so that the wipers are, in effect, advanced a slight distance over the toe end of the shoe, see FIG. 26. In FIG. 10 the plunger 382 is shown as thus withdrawn, but the wiper carrier and other parts have not as yet moved to the left under the influence of the plungers 372. At a later point in the operating cycle and after the innermost layers of the upper materials have been trimmed away by the knives 120, 122 and 122, and the cement nozzle 130 moved to its operative position, FIG. 28, fluid under pressure is admitted to the cylinder 341 through port 344 and a control valve A–14 to cause the piston 336 to be moved to the right, FIG. 10, thereby advancing and closing the wipers in a manner about to be explained, operating fluid now being exhausted through port 346 and a control valve A–6 associated with the manifold 468.

During the advancing and closing of the wipers, fluid under pressure is admitted from the manifold to the port 460 through the control valve A–14 and a pressure reducing valve 472, and to the port 454 from the manifold, through a manually operable pressure reducing valve 470 and check valve 471, see valves 470 and 472 which are manually adjustable valves of conventional type, and are diagrammatically illustrated in FIG. 29. Also connected to the port 454 is a relief valve 473 which is likewise manually adjustable and of conventional type. As will be apparent, when the piston 430 has been fully elevated, fluid under pressure admitted through the port 460 will enter the cylinder bore 428 and tend to lift the piston 424, while fluid under pressure will enter this cylinder bore above this piston through the port 454 and exert a force on the piston 424 in the opposite direction. On the one hand, by suitably controlling, by means of the valve 472, the pressure of the fluid admitted through the port 460, some or all of the weight of the wiper support 110 and of the other parts carried thereby may be counterbalanced and, on the other hand, by suitable controlling, by means of the relief valve 473, the pressure of the fluid as it is discharged through the port 454 and valve 473, the force which the wipers 106, 106 exert on the upper materials in a direction extending heightwise of the shoe, may be varied to suit different operating conditions. It will be noted that the admission of fluid under pressure to port 460 and the resulting counterbalancing action occurs in time relation to the advancing and closing of the wipers.

Referring to FIG. 8, the wiper holders 300, 300 are each formed with an arcuate series of gear teeth 500, 500 and these teeth are in mesh with correspondingly shaped teeth 502, 502 cut on two levers 504, 504. These levers are pivotally mounted by means of screw studs 506, 506 on the intermediate member 302 and are connected, by means of links 508, 508 to the enlarged outer ends 510, 510 of pistons 512, 512. These pistons are fitted in bores 514, 514 formed in cylinders 516, 516 which are mounted on the wiper support 110. The spaces in these bores behind the pistons are connected together and to a source of fluid under pressure through a valve 520, FIG. 9, and pipes 522, 522. As is diagrammatically illustrated in FIG. 29, the valve 520 has a plunger 530 which is urged by a spring 532 to a position to block off communication between the pipes 522, 522 and which is adapted to be moved against the resistance of this spring by fluid under pressure admitted to a fluid pressure actuator 534 from the manifold 468 through a control valve A–5 to a position in which these two pipes, and hence the cylinders 516, 516 are placed into communication with each other and with an accumulator 540, FIG. 29, to which fluid under pressure, controlled by a manually adjustable pressure regulator valve 542, is supplied from the manifold.

When the wiper carrier 108 is in its retracted position, see FIG. 10, the wipers are yieldingly held closed by pressure of the operating fluid on the pistons 512, 512 and in positions determined by the engagement of the enlarged ends 510, 510 of these pistons with stop blocks 550, 550 which are slidably mounted on the wiper support for adjustment therealong by means of screws 552, 552 (FIG. 11). These adjusting screws are each formed integrally on a shaft 554 and these shafts, which are connected together by means of a sprocket chain 556, each carry at their outer end an adjusting knob 558 by means of which the closed positions of the wipers may be variably predetermined.

During the upwiping action of the wipers 106, 106 which occurs as the wiper support 110 is being moved upwardly by the piston 430, as above explained, each of the wipers may yield outwardly away from the shoe, independently of the other wiper, thus to accommodate itself to the shape of the toe end of the shoe, to a slight lateral misalinement of the shoe from exactly centered position or in response to pressure of the upper materials thereagainst, inasmuch as fluid under pressure is at this time supplied to the actuator 534 to hold the valve 530 (FIG. 29) in its uppermost position, i.e., elevated from the position shown, and such yielding of the wipers can take place against the force exerted by its associated piston 512. As will be apparent, the force exerted by these pistons and hence by the wipers on the upper materials of the shoe may be readily varied by suitable adjustment of the pressure regulator valve 542. However, at the conclusion of the upwiping action, and before fluid under pressure is admitted to the cylinder 341 through the port 344 and control valve A–14 to advance and close the wipers, fluid under pressure is exhausted from the actuator 534 through valve A–5 so that spring 532 may move the valve member 530 to its lowermost position, see FIG. 29, thereby trapping operating fluid within the cylinders 516, 516. Accordingly, as the piston 336 is moved to the right, FIG. 10 and the carrier 108 is moved to the left (i.e., downwardly in FIG. 8), the wipers 106, 106 will each be positively closed an equal amount from the position it has assumed as the result of the upwiping operation.

The central distributor finger 112 is secured, by means of a screw 600, to the outer end of a slide 602 which is slidably mounted on the support 115 by means of two guide members 604, 604, FIGS. 17, 19, 22 and 23. The two other distributor fingers 114, 114 are each secured, by means of a screw 606, to an arm 608 which is pivotally mounted on the slide 602 by means of a pin 610, FIG. 20, on which each of two operating arms 612, 612 are also pivoted. Oppositely facing V-shaped grooves 614, 616 are formed, respectively, in each of these sets of overlapping arms 608 and 612, see FIG. 21, and fitted into these grooves are oppositely facing V-blocks 618, 620 held together by a stem 622 and a snap ring 623. Each of the blocks 620 is provided with a threaded hole to receive an adjusting screw 624 which is held against axial movement in its associated arm 612 by means of a collar 626, FIG. 20, and carries on its outer end a hand knob 628. As will be apparent, by rotating the adjusting screws 624, the angular relationship between the arms 608 and 612 may be varied to position the retarder fingers 114, 114 to accommodate shoes of different sizes. Coil springs 630, 630 are stretched between pins 632, 632 on the arms 612, 612 and a pin 634 carried by the slide 602, FIG. 20, and these springs tend to hold the arms 612, 612 and also the retarder fingers 114, 114 in the closed position in which they are shown and with the arms 612 in engagement with a stop roll 635 on the pin 634, see FIGS. 17, 19, 20 and 23. In FIG. 20, the distributor fingers 114 are also shown in closed position but have been adjusted, by means of the screws 624, 624 in order to accommodate a larger size shoe.

The slide 602 has a groove 650 formed therein in which are received two guide pins 652, 652 carried by a block 654, FIG. 17. Connected to this block, by means of one of these pins, is one end of a link 656, the other end of which is connected to an arm 658 which is pivotally mounted on the distributor support 115 by means of a stud 660. This arm is connected, by means of a link 662, to a piston 664, fitted in a cylinder 666, and when fluid is exhausted from this cylinder, through a conduit 668, a coil spring 669 swings the arm 658 in a counterclockwise direction, see FIG. 17. At its lower end, the block 654 is wedge shaped, as indicated at 670, and this wedge-shaped end of the block is adapted to be inserted between inclined surfaces 672, 672, formed on the arms 612, 612, FIG. 20, when the arm 658 is swung to the position shown in FIG. 17 to move the slide 602 to a position determined by the engagement of a shoulder 674, formed on the slide, see FIG. 19, with a latch block 676. This latch block is slidably mounted on the distributor support between limits determined by a pin 678 thereon which projects upwardly through a slot 680, FIGS. 22 and 23, in a portion of one of the guide members 604. A coil spring 690 is interposed between the latch block 676 and a portion of a locking lever 692. This locking lever is pivotally mounted on the support by means of a screw stud 694 and is provided with a hooked end 696, see FIG. 22. Carried by the slide 602 is a cam 698, FIGS. 17, 19, 22 and 23, adapted to engage the pin 678 and thereby withdraw the latch block 676 from a position to engage the shoulder 674, when fluid under pressure is admitted to the cylinder 666 and arm 658 is swung in a clockwise direction to the extent permitted by the engagement of a stop surface 700 thereon with a stop block 702, see FIG. 19.

Slidable laterally of the slide 602 is a latch block 710 which has an inclined operating surface 712 on its upper side which is adapted to cooperate with a similarly inclined abutment surface 714 formed on one of the guides 604, FIGS. 17 and 19, and having a straight lower edge adapted to engage a straight abutment surface 715 also formed on the aforementioned guide, FIG. 22. Connected to this latch block is one end of a lever 716 which is pivotally mounted, by means of a screw stud 718, on the slide 602 and which has connected to its other end a tension spring 720. This lever carries a roll 722 which is adapted to be engaged by a camming surface 724, formed on an arm 726 which is secured to the block 654, during an initial movement of this block by the arm 658, which occurs before the uppermost pin 652 reaches the end of the groove 650, thereby to withdraw the latch block 710 and release the slide 602 for movement by the arm 658 and piston 664.

Slidably mounted in the left-hand guide member 604, FIG. 17, is another latch block 730 which is connected to the upper end of a lever 732, pivotally mounted on this guide member by means of a screw stud 734 and carrying at its lower end a cam roll 736. Also slidable in a laterally extending portion of the aforementioned guide member is a block 740 having a rectangular notch 742 on its side facing the latch block 730, which notch is of a width slightly greater than that of the block 730, see FIG. 23. Connected to the upper end of the block 740 is one end of an operating lever 750 which is pivotally mounted on a screw stud 752 and has its opposite end connected to the inner end of a plunger 754. This plunger is slidably mounted in a bore 756, formed in a portion of the distributor support 115, and carries at its outer end a cam roll 758, FIGS. 17, 19, 22 and 23. A coil spring 760 is arranged to swing the lever 750 in a clockwise direction, as viewed in the aforementioned figures, the extent of such swinging movement at certain times during the operating cycle of the machine being limited, FIGS. 17 and 19, by the engagement of the roll 758 with the operating surface 762 of a cam member 764 which is carried by and extends downwardly from the arm 132, FIG. 1.

As is shown in FIG. 17, a coil spring 770 is arranged to swing the lever 732 in a counterclockwise direction and thus draw the left-hand end of the latch block 730 into the notch 742 in the block 740. Pivotally mounted on the screw stud 734, above the lever 732, is a lever 772 which has a rounded end 774 adapted to be engaged by a rounded projection 776 formed on a member 778, secured to the slide 602 and provided with an inclined cam surface 779. Connected to the other end of the lever 772 is a tension spring 780 and extending downwardly from this lever is a pin 782 which is in line with the lower end of the block 740, FIGS. 17, 19, 22 and 23.

The distributor support 115 has two downwardly extending portions 800, 800, FIG. 2, and connected to each of these downwardly extending portions are the outer ends of upper and lower supporting arms 802, 804, FIGS. 1 and 2. These arms are pivotally mounted on the frame construction 116 and provide for a substantially vertical movement of the support 115. Extending between the downwardly extending portions 800, 800 is a cross member 806, FIG. 2, see also FIG. 16, and connected to the middle portion of this cross member, by means of a link 810 and a cross pin 812, is the upper bifurcated end 814 of a piston rod 816. This piston rod extends through a bore 818 in a cover 820 which is associated with a cylinder 822 having a bore 824, FIG. 15, and has formed integrally therewith a piston 826. This piston is slidable within the bore 828 of a hollow piston 830 which has a closed lower end 832 and is provided with radial ports 834, 834 and an annular recess 836. Leading into the bore 824 of the piston 822 are three different ports 838, 840 and 842 which are located as indicated in FIG. 15.

Stretched between the lower side of the wiper support 110 and a bracket member 844, secured to each of the downwardly extending portions 800 of the distributor support 115, FIGS. 1, 2 and 15, are coil springs 846, and the constant force exerted by these springs is just sufficient to counterbalance substantially all of the weight of the distributor support, distributors and distributor operating mechanism carried thereby. Therefore, the force with which the distributor fingers 112, 114, 114 press against the lasting margin of the upper materials, which are outspread on the wipers 106, 106, during the upwiping operation (FIG. 25), will be determined by the pressure of operating fluid acting on the upper end of the piston 826 which will be elevated (FIG. 15) during the upwiping operation. For that purpose, the port 838 is connected to the manifold 468 through a control valve B–3, a check valve 850, and a manually adjustable relief valve 852, FIG. 29. As will be readily apparent, by changing the loading of this relief valve, the force required to lift the piston 826 and hence to lift the distributor fingers 112, 114 and 114 may be varied to suit different operating conditions. Inasmuch as the distributor fingers and the distributor support 115 are moved upwardly with the wipers, which are elevated by upward movement of the wiper support 110, the tension of the springs 846, 846 will remain substantially constant as, of course, does the pressure exerted by the operating fluid against the piston 826. Again referring to FIG. 29, ports 840 and 842 are connected, respectively, to control valves A–8 and A–15, which are associated with the manifold 468. Prior to the beginning of the automatic operating cycle of the machine, the valve B–3 is opened and fluid under a relatively low pressure (50 p.s.i.) is supplied to the port 838. Now, at the beginning of the automatic operating cycle, this valve is closed, and because of the action of the check valve 850, operating fluid can escape through the port 838 only by way of the relief valve 852. After the wiper carrier 110 has completed its upward movement, thereby elevating the wipers 106, 106 into the wiping plane, FIG. 26, a control valve A–4 is opened to supply fluid under relatively high pressure (180 p.s.i.) from the manifold 468 to cylinder 666. Because of the pressure exerted by the distributor fingers 112, 114 and 114 on the upper materials (see upper U and lining L), movement of the slide 602 from the position in which it is shown in FIG. 17 to the position in which it is shown in FIG. 19 by piston 664 is for the time being prevented. Just as the trimming knife 120, which operates a little ahead of the knives 122, 122, commences to move, the valve A–15 opens and fluid under pressure from the manifold is admitted to the port 842. As the hollow piston 830 is now moved upwardly and into engagement with the lower side of the cylinder cover 820, the closed lower end 832 of this piston contacts the lower end of the piston 826 and by lifting it, elevates the distributor support 115 approximately ⅛″. This elevation of the distributor support is sufficient to lift the distributor fingers away from the upper materials, whereupon the piston 664 moves the slide 602, and together with it the distributor fingers, to the position shown in FIG. 19, this movement of the distributor fingers occuring just ahead of the forwardly moving trimming knife 120 and the laterally moving trimming knives 122, 122, retarder finder 112 finally reaching a position indicated in FIG. 27 by the reference character 112(*a*).

After the trimming operation has been completed and the arm 132 elevated, FIG. 1, valve A–8 is opened to admit fluid under pressure from the manifold to the port 840, thus causing the piston 826 to be moved upwardly within the hollow piston 830 until it engages the lower side of the cover 820, thereby elevating the distributor support an additional amount approximately ⅝″ so that the distributor finger 112 occupies a position indicated in FIG. 27 by the reference character 112(*b*). Now, valve A–4 is moved to a position to exhaust operating fluid from the cylinder 666 and the slide 602 is moved to the position shown in FIG. 22 by the spring 669, which position is determined by the engagement of the lower side of the latch block 710 with the stop surface 715. Immediately thereafter, the valves A–8 and A–15 are moved to positions to connect their associated ports 840 and 842 to exhaust, thereby permitting the distributor support 115 to move downwardly under the influence of gravity to an extent determined by the engagement of two stop screws 854, 854 with the top surface of the wiper support 110.

For determining the initial position of the distributor support 115, two stop surfaces 860, 860 are provided on one arm of a bell-crank lever 862, FIGS. 15 and 16. Connected to the other arm of this bell-crank lever is an adjusting screw 864 on which there is threaded an adjusting nut 866 which is adapted to be rotated by means including a chain 868, FIG. 16. As will be apparent, by raising or lowering the distributor support 115, by means of the lever 862 and adjusting screw 864, when it is in its initial position (FIG. 1), the length of time the distributor fingers act on the upper materials during the upwiping operation may be varied to suit different operating conditions. As has been pointed out above, the force exerted by the distributor fingers on the upper materials may also be varied by means of the relief valve 852. When the distributor support 115 has been moved downwardly, in the manner just explained, the distributor fingers will occupy positions corresponding to that shown in FIG. 27 in which the central distributor finger is indicated by the reference character 112(*c*).

As the automatic operating cycle proceeds, the arm 132 is moved angularly and then downwardly to bring the cement nozzle 130, FIG. 1, into operating position, FIG. 28. Just as this nozzle begins to descend toward the bottom of the shoe, control valve A–4 is again opened to admit fluid under pressure from the manifold to the cylinder 666. Piston 664 is now operated to withdraw the slide 602 to the position shown in FIG. 23 and as determined by the engagement of the slide with the latch block 730. In this connection, it will be noted that when this slide was moved to the position shown in FIG. 22, the cam surface 779 engaged the roll 736 thereby swinging the lever 732 in a clockwise direction and projecting the latch block 730 to its operative position. Spring 760 now rotates the lever 750 in a clockwise direction to move the block 740 downwardly to the position shown. As the distributor fingers are thus retracted, they ride up over and spread the lasting margin of the upper U (the lasting margin of the lining L having now been trimmed off), outwardly over the wipers, see 112*d*, FIG. 27, and thus hold it in the position shown in FIG. 28 to prevent it from being folded beneath the nozzle 130 as it comes into contact with the bottom of the shoe. In this connection it may be explained that the stop screws 854, 854 are so adjusted that with no shoe in the machine the top surfaces of the wipers would just miss hitting the distributor fingers at the conclusion of the upward movement of the wiper support. Hence, when a shoe is being lasted, these fingers press against the lasting margin of the upper material with a yielding pressure determined by the setting of relief valve 852, in the manner explained above.

Just before the wipers 106, 106 are advanced and closed to wipe the lasting margin of the upper U inwardly over and to press it against the bottom of the shoe, valve A–15 is opened to admit fluid under pressure from the manifold to the port 842 thereby causing the distributor support 115, together with the distributor fingers 112, 114 and 114 to be lifted (about ⅛″), away from the wipers.

Near the conclusion of the automatic operating cycle, after the wiper support 110 has been moved downwardly to its initial position, valves A–4 and A–15 are again operated to connect the cylinder 666 and the port 842 to exhaust so that slide 602 may be returned to the position shown in FIG. 17 and the distributor support 115 fully lowered to a position determined by the engagement of the cross pin 812 with the stop surfaces 860, 860, FIG. 16, thus bringing the distributor fingers back to their original position as indicated in FIG. 24.

The operation of the herein illustrated machine is in general the same as that of the machine of our prior patent, and since it will be readily understood from the foregoing description, especially in connection with the step views of FIGS. 24–28 which correspond to FIGS. 12–16 of our prior patent, it need not be outlined again in detail. This also applies to the general mode of operation of the distributor fingers 112, 114, 114, which is clearly illustrated in the aforementioned step views. It should be noted, however, in the latter connection, that with the improved arrangement for operating the distributor support, which has just been described, a wider range of, and a more accurate, adjustment of the clamping pressure which is exerted by the distributor fingers on the upper materials during the upwiping operation, is provided.

Having thus described our invention, what we claim as new and desire to secure by Letters Patent of the United States is:

1. In a machine for lasting the toe end of a shoe, having a support for a shoe on its last, toe embracing wipers for wiping the upper materials of a shoe around the toe end of the last in response to relative heightwise movement between the wipers and the shoe, and for thereafter wiping the lasting margin of the upper materials inwardly over the toe end of the bottom of the shoe in response to advancing and closing movements of the wipers, means for effecting relative heightwise movement between the wipers and the shoe, mechanism for thereafter imparting advancing movements to the wipers, and mechanism for closing the wipers in response to this advancing movement including means for yieldingly holding said wipers in a variably predetermined closed position during relative heightwise movement between the wiper and the shoe support and for positively closing said wipers during their advancing movement.

2. In a machine for lasting the toe end of a shoe, having a support for a shoe on its last, toe embracing wipers for wiping the upper materials of a shoe around the toe end of the last in response to relative heightwise movement between the wipers and the shoe, and for thereafter wiping the lasting margin of the upper materials inwardly over the toe end of the bottom of the shoe in response to advancing and closing movements of the wipers, means for effecting relative heightwise movement between the wipers and the shoe, mechanism for thereafter imparting advancing movements to the wipers, and mechanism for closing the wipers in response to this advancing movement including fluid pressure means for yieldingly holding said wipers in a variably predetermined closed position during relative heightwise movement between the wipers and the shoe and for positively closing said wipers during their advancing movement.

3. In a machine for lasting the toe end of a shoe, having a support for a shoe on its last, toe embracing wipers for wiping the upper materials of a shoe around the toe end of the last in response to relative heightwise movement between the wipers and the shoe, and for thereafter wiping the lasting margin of the upper materials inwardly over the toe end of the bottom of the shoe in response to advancing and closing movements of the wipers, means for effecting relative heightwise movement between the wipers and the shoe, mechanism for thereafter imparting advancing movements to the wipers, and mechanism for closing the wipers in response to this advancing movement including means for exerting a variably predetermined force on said wipers for yieldingly urging them toward a variably predetermined closed position during relative heightwise movement between the wipers and the shoe and for positively closing said wipers during their advancing movement.

4. In a machine for lasting the toe end of a shoe, having a support for a shoe on its last, toe embracing wipers for wiping the upper materials of a shoe around the toe end of the last in response to relative heightwise movement between the wipers and the shoe, and for thereafter wiping the lasting margin of the upper materials inwardly over the toe end of the bottom of the shoe in response to advancing and closing movements of the wipers, means for effecting relative heightwise movement between the wipers and the shoe, mechanism for thereafter imparting advancing movements to the wipers, and mechanism for closing the wipers in response to this advancing movement including fluid pressure means for exerting a variably predetermined force on said wipers for yieldingly urging them toward a variably predetermined closed position during relative heightwise movement between the wipers and the shoe and for positively closing said wipers during their advancing movement.

5. In a machine for lasting the toe end of a shoe, having a support for a shoe on its last, toe embracing wipers for wiping the upper materials of a shoe around the toe end of the last in response to relative heightwise movement between the wipers and the shoe, and for thereafter wiping the lasting margin of the upper materials inwardly over the toe end of the bottom of the shoe in response to advancing and closing movements of the wipers, means for effecting relative heightwise movement between the wipers and the shoe, mechanism for thereafter imparting advancing movements to the wipers, and mechanism for closing the wipers in response to this advancing movement including a pair of wiper closing members associated, respectively, with each of the wipers, a piston connected to each of said members, a cylinder for each piston, means for supplying operating fluid under a variably predetermined pressure to each of said cylinders to cause said pistons to exert forces on said operating members for yieldingly urging the wipers toward closed position, during the relative heightwise movement between the wipers and the shoe, and means for trapping operating fluid in said cylinders to cause said pistons to exert forces on said wiper closing members for positively closing the wipers during their advancing movement.

6. In a machine for lasting the toe end of a shoe, having a support for a shoe on its last, toe embracing wipers for wiping the upper materials of a shoe around the toe end of the last in response to relative heightwise movement between the wipers and the shoe, and for thereafter wiping the lasting margin of the upper materials inwardly over the toe end of the bottom of the shoe in response to advancing and closing movements of the wipers, means for effecting relative heightwise movement between the wipers and the shoe, mechanism for thereafter imparting advancing movements to the wipers, and mechanism for closing the wipers in response to this advancing movement including a pair of wiper closing members associated, respectively, with each of the wipers, a piston connected to each of said members, a cylinder for each piston, means for supplying operating fluid under a variably predetermined pressure to each of said cylinders to cause said pistons to exert forces on said operating members for yieldingly urging the wipers toward a variably predetermined closed position, during the relative heightwise movement between the wipers and the shoe, and means for trapping operating fluid in said cylinders to cause said pistons to exert forces on said wiper operating members for positively closing the wipers during their advancing movements.

7. In a machine for lasting the toe end of a shoe, having a support for a shoe on its last, toe embracing wipers for wiping the upper materials of a shoe around the toe end of the last in response to relative heightwise movement between the wipers and the shoe, and for thereafter wiping the lasting margin of the upper materials inwardly over the toe end of the bottom of the shoe in response to advancing and closing movements of the wipers, means for effecting relative heightwise movement between the wipers and the shoe, mechanism for thereafter imparting advancing movements to the wipers, and mechanism for closing the wipers in response to this advancing movement including a wiper carrier movable in a direction to advance the wipers, wiper holders mounted on said carrier for arcuate movement to close the wipers, a pair of wiper operating levers pivotally mounted on the carried and having one of their arms operatively connected to said holders, pistons connected to the other arms of these levers, a cylinder for each piston, means for supplying operating fluid under predetermined pressure to each of said cylinders to cause said pistons to exert forces on said wiper operating levers for yieldingly urging the wipers toward closed position, during relative heightwise movement between the wipers and the shoe, and means for trapping operating fluid in said cylinders to cause said pistons to exert forces on said wiper operating levers for positively closing the wipers during their advancing movement.

8. In a machine for lasting the toe end of a shoe, having a support for a shoe on its last, toe embracing wipers for wiping the upper materials of a shoe around the toe end of the last in response to relative heightwise movement between the wipers and the shoe, and for thereafter wiping the lasting margin of the upper materials inwardly over the toe end of the bottom of the shoe in response to advancing and closing movements of the wipers, means for effecting relative heightwise movement between the wipers and the shoe, mechanism for thereafter imparting advancing movements to the wipers, and mechanism for closing the wipers in response to this advancing movement including a wiper carrier movable in a direction to advance the wipers, wiper holders mounted on said carrier for arcuate movement to close the wipers, a pair of wiper operating levers pivotally mounted on the carrier and having one of their arms operatively connected to said holders, pistons connected to the other arms of these levers, a cylinder for each piston, means for supplying operating fluid under a variably predetermined pressure to each of said cylinders to cause said pistons to exert a force on said wiper operating levers for yieldingly urging the wipers toward a variably predetermined closed position, during the relative heightwise movement between the wipers and the shoe, and means for trapping operating fluid in said cylinders to cause said pistons to exert forces on said wiper operating levers for positively closing the wipers during their advancing movement.

9. In a machine for lasting the toe end of a shoe, a support for a shoe on its last, toe embracing wipers, a wiper support movable relatively to the shoe support in a direction extending heightwise of a shoe thereon, a wiper carrier mounted on the wiper support for movement to advance and close the wipers, means for moving the wiper support in said heightwise direction to cause the wipers to wipe the upper materials heightwise around the toe end of the last, means for thereafter moving the wiper carrier to advance and close the wipers, means operable in time relation to said wiper advancing and closing means for exerting a force on the wiper support tending to counterbalance the weight of the wiper support and parts carried thereby during the advancing and closing of the wipers, and fluid pressure operated means for exerting a predetermined force on the wiper support for causing the wipers to press the upper materials yieldingly against the bottom of the shoe as they are advanced and closed.

10. In a machine for lasting the toe end of a shoe, a support for a shoe on its last, toe embracing wipers, a wiper support movable relatively to the shoe support in a direction extending heightwise of a shoe thereon, a wiper carrier mounted on the wiper support for movement to advance and close the wipers, means for moving the wiper support in said heightwise direction to cause the wipers to wipe the upper materials heightwise around the toe end of the last, means for thereafter moving the wiper carrier to advance and close the wipers, means operable in time relation to said wiper advancing and closing means for exerting a force on the wiper support tending to counterbalance the weight of the wiper support and parts carried thereby during the advancing and closing of the wipers, and fluid pressure operated means for exerting a variably predetermined force on the wiper support for causing the wipers to press the upper materials yielding against the bottom of the shoe as they are advanced and closed.

11. In a machine for lasting the toe end of a shoe, a support for a shoe on its last, toe embracing wipers, a wiper support movable relatively to the shoe support in a direction extending heightwise of a shoe thereon, a wiper carrier mounted on the wiper support for movement to advance and close the wipers, means for moving the wiper support in said heightwise direction to cause the wipers to wipe the upper materials heightwise around the toe end of the last, said means for moving the wiper support in a heightwise direction comprising a hollow piston closed at its lower end and a second piston slidable within the hollow piston and connected to the wiper support, means for thereafter moving the wiper carrier to advance and close the wipers, means for elevating the hollow piston to effect heightwise movement of the wiper support, and means operating in time relation to said wiper advancing and closing means for introducing fluid under pressure into the hollow piston beneath the second piston to cause said second piston to exert a force on the wiper support tending to counterbalance the weight of the wiper support and parts carried thereby during the advancing and closing of the wipers.

12. In a machine for lasting the toe end of a shoe, a support for a shoe on its last, toe embracing wipers, a wiper support movable relatively to the shoe support in a direction extending heightwise of a shoe thereon, a wiper carrier mounted on the wiper support for movement to advance and close the wipers, means for moving the wiper support in said heightwise direction to cause the wipers to wipe the upper materials heightwise around the toe end of the last, said means for moving the wiper support in a heightwise direction comprising a hollow piston closed at its lower end and a second piston slidable within the hollow piston and connected to the wiper support, means for thereafter moving the wiper carrier to advance and close the wipers, fluid pressure operated means for elevating the hollow piston to effect heightwise movement of the wiper support, and means operating in time relation to said wiper advancing and closing means for introducing fluid under a variably predetermined pressure into the hollow piston beneath the second piston to cause said second piston to exert a force on the wiper support tending to counterbalance the weight of the wiper support and parts carried thereby during the advancing and closing of the wipers.

13. In a machine for lasting the toe end of a shoe, a support for a shoe on its last, toe embracing wipers, a wiper support movable relatively to the shoe support in a direction extending heightwise of a shoe thereon, a wiper carrier mounted on the wiper support for movement to advance and close the wipers, means for moving the wiper support in said heightwise direction to cause the wipers to wipe the upper materials heightwise around the toe end of the last, said means for moving the wiper support in a heightwise direction comprising a hollow piston closed at its lower end and a second piston slidable within the hollow piston and connected to the wiper support, means for thereafter moving the wiper carrier to advance and close the wipers, fluid pressure operated means for elevating the hollow piston to effect heightwise movement of the wiper support, means operating in time relation to said wiper advancing and closing means for introducing fluid under pressure into the hollow piston beneath the second piston to cause said second piston to exert a force on the wiper support tending to counterbalance the weight of the wiper support and parts carried thereby during the advancing and closing of the wipers, and means for introducing fluid under a predetermined pressure into the hollow piston above the second piston to cause said second piston to exert a predetermined force on the wiper support for causing the wipers to press the upper materials yieldingly against the bottom of the shoe as they are advanced and closed.

14. In a machine for lasting the toe end of a shoe, a support for a shoe on its last, toe embracing wipers, a wiper support movable relatively to the shoe support in a direction extending heightwise of a shoe thereon, a wiper carrier mounted on the wiper support for movement to advance and close the wipers, means for moving the wiper support in said heightwise direction to cause the wipers to wipe the upper materials heightwise around the toe end of the last, said means for moving the wiper support in a heightwise direction comprising a hollow piston closed at its lower end and a second piston slidable within the hollow piston and connected to the wiper support, means for thereafter moving the wiper carrier to advance and close the wipers, means for elevating the hollow piston to effect heightwise movement of the wiper support, and means operating in time relation to said wiper advancing and closing means for introducing fluid under a variably predetermined pressure into the hollow piston beneath the second piston to cause said second piston to exert a force on the wiper support tending to counter-balance the weight of the wiper support and parts carried thereby during the advancing and closing of the wipers, and means for introducing fluid under a predetermined pressure into the hollow piston above the second piston to cause said second piston to exert a predetermined force on the wiper support for causing the wipers to press the upper materials yieldingly against the bottom of the shoe as they are advanced and closed.

15. In a machine for lasting the toe end of a shoe, a support for a shoe on its last, toe embracing wipers, a wiper support movable relatively to the shoe support in a direction extending heightwise of a shoe thereon, a wiper carrier mounted on the wiper support for movement to advance and close the wipers, means for moving the wiper support in said heightwise direction to cause the wipers to wipe the upper materials heightwise around the toe end of the last, said means for moving the wiper support in a heightwise direction comprising a hollow piston closed at its lower end and a second piston slidable within the hollow piston and connected to the wiper support, means for thereafter moving the wiper carrier to advance and close the wipers, means for elevating the hollow piston to effect heightwise movement of the wiper support, means operating in time relation to said wiper advancing and closing means for introducing fluid under pressure into the hollow piston beneath the second piston to cause said second piston to exert a force on the wiper support tending to counterbalance the weight of the wiper support and parts carried thereby during the advancing and closing of the wipers, and means for introducing fluid under a variably predetermined pressure into the hollow piston above the second piston to cause said second piston to exert a predetermined force on the wiper support for causing the wipers to press the upper matrials, yieldingly against the bottom of the shoe as they are advanced and closed.

16. In a machine for lasting the toe end of a shoe, a support for a shoe on its last, toe embracing wipers, a wiper support movable relatively to the shoe support in a direction extending heightwise of a shoe thereon, a wiper carrier mounted on the wiper support for movement to advance and close the wipers, means for moving the wiper support in said heightwise direction to cause the wipers to wipe the upper materials heightwise around the toe end of the last, said means for moving the wiper support in a heightwise direction comprising a hollow piston closed at its lower end and a second piston slidable within the hollow piston and connected to the wiper support, means for thereafter moving the wiper carrier to advance and close the wipers, fluid pressure operated means for elevating the hollow piston to effect heightwise movement of the wiper support, means operating in time relation to said wiper advancing and closing means for introducing fluid under a variably predetermined pressure into the hollow piston beneath the second piston to cause said second piston to exert a force on the wiper support tending to counter-balance the weight of the wiper support and parts carried thereby during the advancing and closing of the wipers, and means for introducing fluid under a variably predetermined pressure into the hollow piston above the second piston to cause said second piston to exert a predetermined force on the wiper support for causing the wiper to press the upper materials yieldingly against the bottom of the shoe as they are advanced and closed.

References Cited in the file of this patent

UNITED STATES PATENTS

| | | |
|---|---|---|
| 2,349,815 | Eastman | May 30, 1944 |
| 2,371,612 | Ericson | Mar. 20, 1945 |
| 2,385,414 | Halmgren | Sept. 25, 1945 |
| 2,388,367 | Robinson | Nov. 6, 1945 |
| 2,446,330 | Holmgren | Aug. 3, 1948 |
| 2,479,575 | Jorgensen | Aug. 23, 1949 |
| 2,663,036 | Jorgensen | Dec. 22, 1953 |
| 2,722,022 | Lutyens et al. | Nov. 1, 1955 |
| 2,804,634 | Bowler et al. | Sept. 3, 1957 |
| 2,888,693 | Weisz | June 2, 1957 |